(12) United States Patent
Fredlund et al.

(10) Patent No.: US 7,705,908 B2
(45) Date of Patent: Apr. 27, 2010

(54) IMAGING METHOD AND SYSTEM FOR DETERMINING CAMERA OPERATING PARAMETER

(75) Inventors: John R. Fredlund, Rochester, NY (US); Gary A. Hallenbeck, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1849 days.

(21) Appl. No.: 10/737,454

(22) Filed: Dec. 16, 2003

(65) Prior Publication Data
US 2005/0128312 A1 Jun. 16, 2005

(51) Int. Cl.
G03B 13/00 (2006.01)
H04N 5/232 (2006.01)
H04N 5/228 (2006.01)

(52) U.S. Cl. ............... 348/349; 348/222.1; 348/345
(58) Field of Classification Search ............... 348/222.1, 348/345, 348
See application file for complete search history.

(56) References Cited

U.S. PATENT DOCUMENTS

| | | | |
|---|---|---|---|
| 3,971,065 A | 7/1976 | Bayer | |
| 4,621,292 A * | 11/1986 | Hirao et al. | 348/348 |
| 4,642,678 A | 2/1987 | Cok | |
| 5,006,700 A * | 4/1991 | Kosaka et al. | 250/201.4 |
| 5,016,107 A | 5/1991 | Sasson et al. | |
| 5,164,831 A | 11/1992 | Kuchta et al. | |
| 5,373,322 A | 12/1994 | LaRoche et al. | |
| 5,440,369 A | 8/1995 | Tabata et al. | |
| 5,668,597 A | 9/1997 | Parulski et al. | |
| 5,715,483 A | 2/1998 | Omata et al. | |
| 5,765,045 A | 6/1998 | Takagi et al. | |
| 5,874,994 A | 2/1999 | Xie et al. | |
| 5,877,809 A | 3/1999 | Omata et al. | |
| 6,067,114 A | 5/2000 | Omata et al. | |
| 6,118,484 A * | 9/2000 | Yokota et al. | 348/350 |
| 6,252,989 B1 | 6/2001 | Geisler et al. | |
| 6,785,469 B1 * | 8/2004 | Ide et al. | 396/121 |
| 7,071,985 B1 * | 7/2006 | Onoda et al. | 348/349 |
| 7,079,188 B2 * | 7/2006 | Shiraishi et al. | 348/350 |
| 7,317,488 B2 * | 1/2008 | Yamazaki | 348/353 |
| 7,339,606 B2 * | 3/2008 | Fukuda et al. | 348/143 |
| 2002/0080261 A1 * | 6/2002 | Kitamura et al. | 348/349 |
| 2003/0067551 A1 | 4/2003 | Venturino et al. | |
| 2003/0156216 A1 * | 8/2003 | Nonaka | 348/345 |
| 2004/0066563 A1 | 4/2004 | Voss et al. | |

FOREIGN PATENT DOCUMENTS

| | | |
|---|---|---|
| EP | 0 994 619 A1 | 4/2000 |
| EP | 1 431 912 A2 | 6/2004 |
| JP | 2001-116985 | 4/2001 |

* cited by examiner

*Primary Examiner*—Tuan Ho
*Assistant Examiner*—Wanda M Negron
(74) *Attorney, Agent, or Firm*—Roland R. Schindler

(57) ABSTRACT

Methods are provided for determining an operating parameter for an image system. Evaluation images are obtained during composition of an archival image and the evaluation images are stored. The evaluation images are compared to determine common image elements and an area of importance is determined based at least in part upon some of the common image elements. An operating parameter is determined based upon analysis of the area of importance. Imaging systems that perform the methods are also provided.

40 Claims, 10 Drawing Sheets

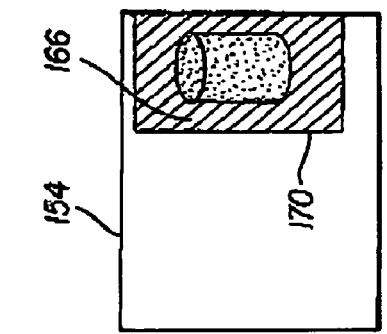
FIG. 9A Time t-5
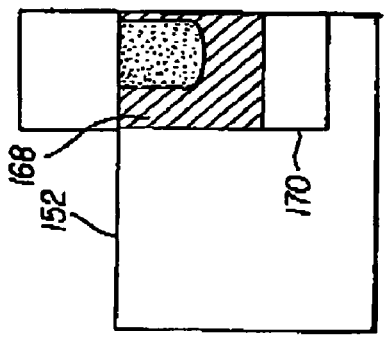
FIG. 9B Time t-4
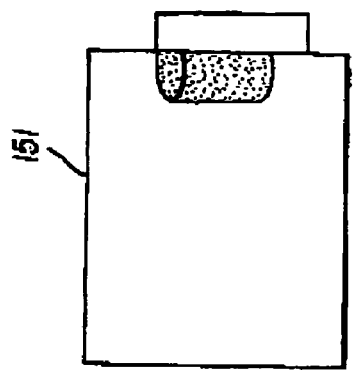
FIG. 9C Time t-3
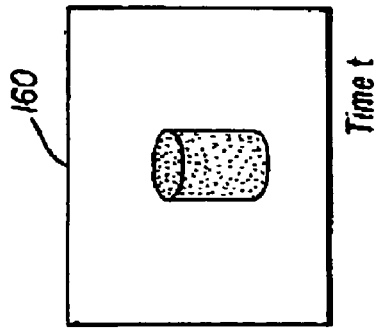
FIG. 9D Time t-2
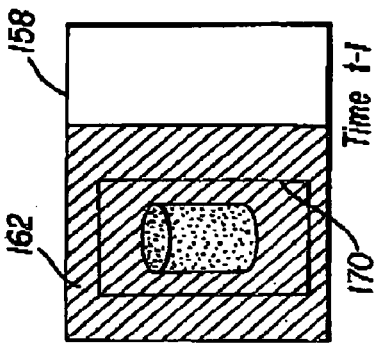
FIG. 9E Time t-1
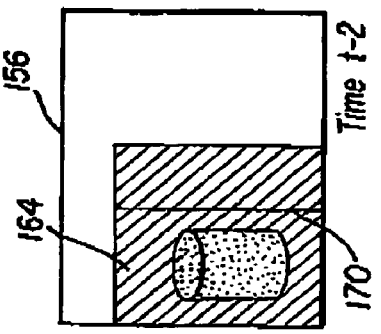
FIG. 9F Time t

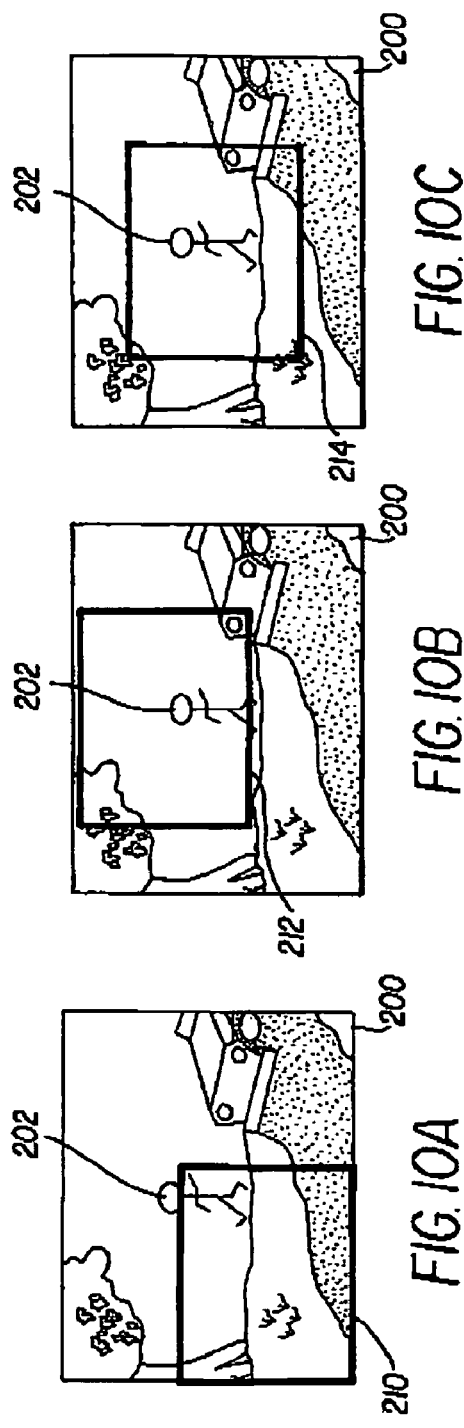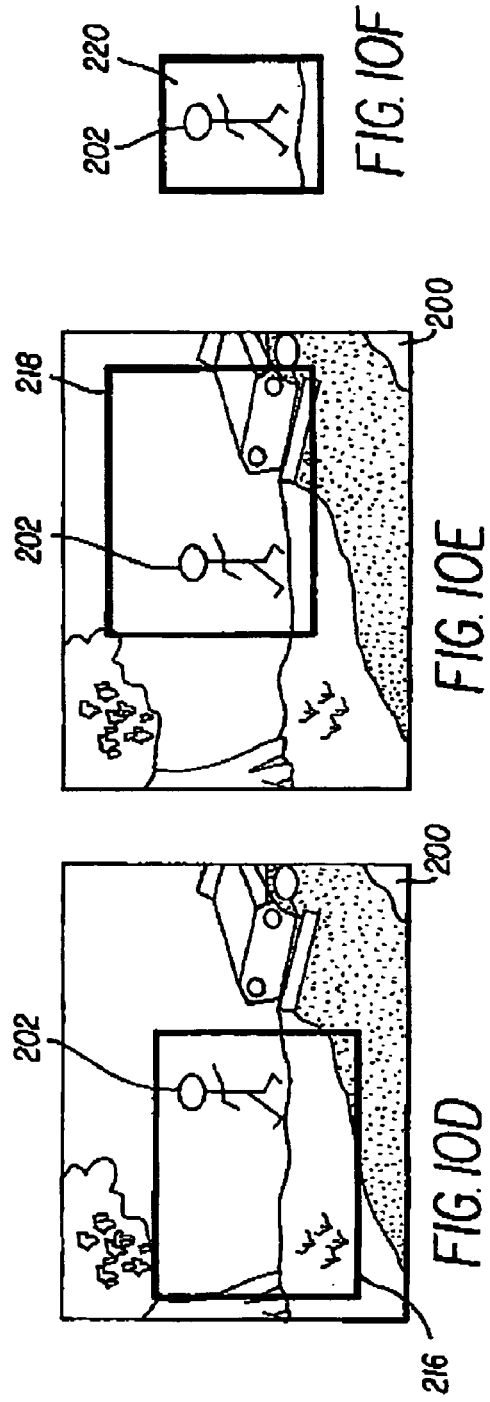

IMAGING METHOD AND SYSTEM FOR DETERMINING CAMERA OPERATING PARAMETER

FIELD OF THE INVENTION

The present invention relates to imaging methods and systems that determine an area of importance in an archival image.

BACKGROUND OF THE INVENTION

A wide variety of cameras are known that automatically and semi-automatically adapt the operation of the camera so that the camera can capture an image using exposure settings, focus settings and other operating parameters that are most appropriate for capturing an image under prevailing scene conditions. These cameras enable even novice photographers to capture high-quality images and thus these cameras have greatly contributed to the popularity of photography.

In many of these cameras, the content of a photographic scene is analyzed prior to the capture of an image using any of a variety of algorithms. These algorithms apply various assumptions about what a user would likely find to be important elements of a scene in order to determine camera settings and other operating parameters to be applied during image capture.

For example, some cameras attempt to determine an area of importance in a photographic scene using information from an optical or other type (e.g. ultrasonic) of rangefinder and to make camera focusing adjustments based upon this information. Such a rangefinder typically determines a distance from the camera to one or more areas of the scene and applies algorithms identifying an assumed area of importance in the scene based upon the distance information. The algorithms used by such a range finder use the distance from the camera to the to the assumed area of importance as a focus distance for focusing a motorized lens system. A wide variety of such rangefinders are known to those of skill in the art. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses one such rangefinder.

Other image capture settings and operating parameters can be determined where the area of importance in the scene is known. For example, exposure settings can be adjusted to provide an exposure level that is appropriate for capturing an image of the area of importance with an appropriate level of exposure. This is particularly useful in backlighting situations.

It will be appreciated that the effectiveness of many of such algorithms can be enhanced where there is a positive indication from the photographer as to what portions of the scene comprise an area of importance. Therefore, there is a need for a way to automatically determine from a photographer's actions which area of a photographic scene is an area of importance so that a camera can accurately determine image capture settings and operating parameters.

A variety of digital and non-digital image capture devices are known which attempt to discern which areas of an image of a scene are of importance to a photographer using eye gaze information. For example, U.S. Pat. No. 5,765,045, entitled "Camera Capable of Detecting Eye-Gaze" filed on Jun. 7, 1995, by Takagi et al. and Japanese Publication, No. JP 2001-116985, entitled "Camera With Subject Recognizing Function and Subject Recognizing Method" filed by Mitsuru on Oct. 12, 1999, discusses the use of the eye gaze monitoring devices in the viewfinders of the cameras described therein. The cameras described in these publications are automatic focus cameras that utilize multi-spot range finding techniques that divide a photographic scene into a plurality of spots or regions and determine a distance from the camera to each spot. The output of the eye gaze monitoring devices described therein is used to help the camera determine which of these spots are most likely to contain the subject of the image and to focus the camera to capture images at a distance that is associated with the determined spot.

The use of eye gaze monitoring has also been discussed in the context of image compression in digital imaging systems. For example, U.S. Pat. No. 6,252,989, entitled "Foveated Image Coding System and Method for Image Bandwidth Reduction" filed by Geissler on Dec. 23, 1997, discusses a technique termed "foveated imaging" in which an observer's eye gaze position is monitored in real-time and communicated to a real-time image capture system that compresses the image to maintain high frequency information near the observer's point of eye gaze and discards high frequency information in regions that are not near the observer's point of eye gaze.

Thus, cameras are known that are adapted to monitor eye gaze and use information from eye gaze monitoring equipment to make decisions about the photographic or video imaging process.

It will be appreciated that while in many circumstances eye gaze monitoring may provide an indication of which elements in images are important to a user, in other circumstances, eye gaze information may not directly indicate which elements in images are important. For example a user can fixate on an object during composition in order to ensure that an image is composed to reduce the appearance of the object in the image. Accordingly, cameras that rely upon eye gaze direction to make decisions in the image capture process may make these decisions based upon erroneous assumptions about which elements of the image are important. Better imaging decisions can be made using eye gaze information during post capture image processing where more information about the user, the scene and/or the elements of interest are available and where more time and more complex image processing algorithms can be applied to better interpret eye gaze information.

Commonly assigned U.S. patent application Ser. No. 10/303,978, entitled, "Digital Imaging System With Eye Monitoring" filed Nov. 25, 2002, by Miller et al. describes an image capture system having an eye monitoring system that stores eye information including eye gaze direction information during an image capture sequence and associates the eye information with an image captured during the image capture sequence. In certain embodiments, context information is also captured with the eye information. The context information is also associated with the image. The eye monitoring system described therein is useful for its intended purpose, has commercial value, and has broad application. However, some consumers prefer not to use eye-monitoring systems. Also, the cost of eye monitoring components may deter their usage. Additionally, eye monitoring systems are known to need calibration for each of different users.

Accordingly, what is needed is a camera and method for determining an area of importance from a photographer's action, in composing a scene so that image capture settings and other operating parameters can be adjusted based upon this information.

SUMMARY OF THE INVENTION

In one aspect of the present invention, a method is provided for determining an operating parameter for an imaging system. In accordance with the method, evaluation images are obtained during composition of an image and the evaluation images are stored. The evaluation images are compared to determine common image elements and an area of importance is determined based at least in part upon some of the common image elements. An operating parameter is determined based upon analysis of the area of importance.

In another aspect of the present invention, a method is provided for operating an image capture device. In accordance with the method, a user input indicating a desire to capture an archival image of a scene is detected and evaluation images are obtained during composition of the archival image. The evaluation images are compared to determine common image elements and an area of importance is determined based upon at least some of the common image elements. An operating parameter is determined based upon analysis of the area of importance. The operation of the image capture device is adjusted based upon the determined operating parameter so that the archival image will be captured using the operating parameter.

In still another aspect of the invention, a method is provided for operating on image capture device. In accordance with the method, a set of evaluation images is captured during composition of an archival image and a preliminary area of importance image is formed based upon the most recently captured evaluation image. Portions of the preliminary area of importance image that do not correspond to image information in other images of the set of evaluation images are extracted from the preliminary area of importance image. An area of importance is determined based upon the area of importance image and an operating parameter is determined based upon analysis of the area importance. The operating parameter is used to capture the archival image.

In a further aspect of the invention, an imaging system is provided. The imaging system has an image source operable to obtain images of a scene and a signal processor adapted to cause the image source to obtain images and to compare the images obtained by the image source to identify common image elements in the images. The signal processor determines an area importance in the scene based at least in part upon the common image elements and determines an operating parameter based upon analysis of the area of importance.

In still another aspect of the invention, and imaging system is provided. The imaging system has a composition trigger adapted to generate a composition signal and a trigger signal adapted to generate a trigger signal. An image capture system is provided and is adapted to capture a evaluation images of the scene when the composition signal is received and an archival image of the scene when an archival image capture signal is generated. The processor is adapted to determine common image elements in the evaluation images and to determine an area of importance in the scene based upon the common image elements. The processor is further adapted to cause the area importance of the scene to be analyzed and to determine operating parameter based upon the analysis of the area of importance. The processor generates a capture signal in response to the trigger signal and causes the operating parameter to be used in the process of capturing the archival image.

In still another aspect of the invention, imaging system is provided. The imaging system has an image capture means for capturing archival image and for capturing evaluation images during composition of the archival image and a comparison means for comparing the evaluation images to identify common image elements. A determination means is provided for determining an area importance in the scene based upon the identified common image elements and a determining means is provided for determining an operating parameter based upon analysis of the area of importance.

BRIEF DESCRIPTION OF THE DRAWINGS

FIGS. 9A-9F illustrate various evaluation images captured during composition of an image; and FIGS. 10A-10E illustrates a photographic scene with various evaluation images captured during composition which are processed to yield an area of importance image shown in FIG. 10F.

DETAILED DESCRIPTION OF THE INVENTION

Figure 1:
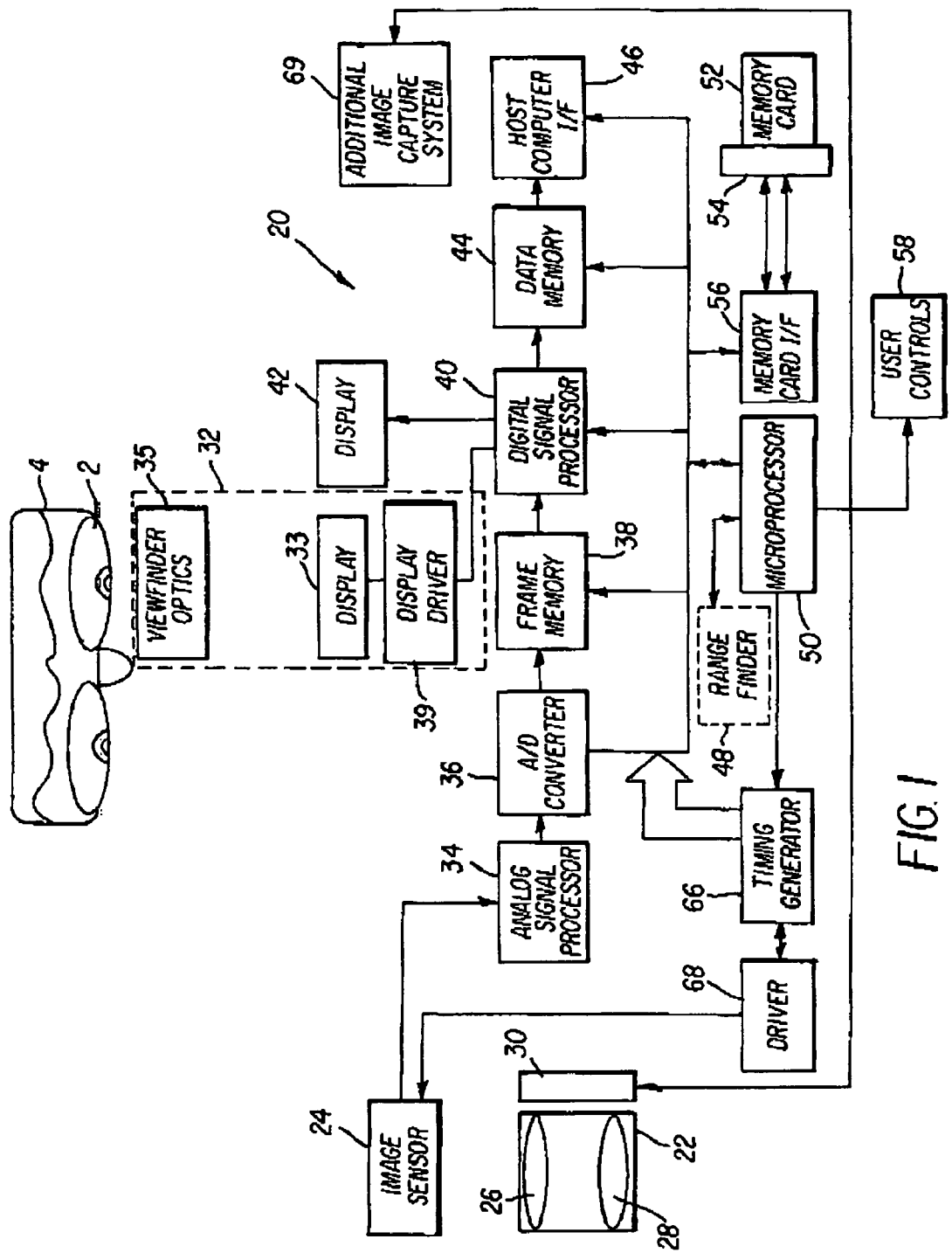
FIG. 1 is an illustration of one embodiment of an imaging system of the present invention.

FIG. 1 shows a block diagram of an embodiment of an imaging system 20 for capturing digital images. As is shown in FIG. 1, imaging system 20 includes a taking lens unit 22, which directs light from a subject (not shown) to form an image on an image sensor 24.

The taking lens unit 22 can be simple, such as having a single focal length with manual focusing or a fixed focus. In the example embodiment shown in FIG. 1, taking lens unit 22 is a motorized 2x zoom lens unit in which a mobile element or combination of elements 26 are driven, relative to a stationary element or combination of elements 28 by a lens driver 30. Lens driver 30 controls both the lens focal length and the lens focus position of taking lens unit 22 by adjusting the mobile elements 26. The methods used to determine lens focal length and/or a lens focus position will be described in greater detail below.

A viewfinder system 32 presents images captured by image sensor 24 to user 4 to help user 4 to compose images. The operation of viewfinder system 32 will be described in greater detail below.

Various methods can be used to determine the focus settings of the taking lens unit 22. Optionally, image sensor 24 can be used to provide multi-spot autofocus using what is called the "through focus" or "whole way scanning" approach. In this approach the scene to be imaged is divided into a grid of regions or spots, and the optimum focus distance is determined for each image region. The optimum focus distance for each region is determined by moving taking lens unit 22 through a range of focus distance positions, from the near focus distance to the infinity position, while capturing images. Depending on the design of imaging system 20, between four and thirty-two images may be captured at different focus distances. Typically, capturing images at eight different distances provides suitable accuracy.

The captured image data are then analyzed to determine the optimum focus distance for each image region. This analysis begins by band-pass filtering the image signals from sensor 24 using one or more filters, as described in commonly assigned U.S. Pat. No. 5,874,994 "Filter Employing Arithmetic Operations for an Electronic Synchronized Digital Camera" filed by Xie et al., on Dec. 11, 1995, the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a one embodiment, the image regions corresponding to a target object (e.g. a person being photographed) are determined using known algorithms, or alternatively using methods described herein below. The focus position is then set to provide the best focus for these image regions. For example, an image of a scene can be divided into a plurality of subdivisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, the bandpass filtering and other calculations used to provide autofocus in imaging system 20 are performed by digital signal processor 40. In this embodiment, imaging system 20 uses a specially adapted image sensor 24, as is shown in commonly assigned U.S. Pat. No. 5,668,597 entitled "Electronic Camera With Rapid Autofocus Upon An Interline Image Sensor", filed by Parulski et al. on Dec. 30, 1994, the disclosure of which is herein incorporated by reference, to automatically set the lens focus position. As described in the '597 patent, only some of the lines of sensor photo elements (e.g. only ¼ of the lines) are used to determine the focus. The other lines are eliminated during the sensor readout process. This reduces the sensor readout time, thus shortening the time required to focus taking lens unit 22.

In an alternative embodiment, imaging system 20 uses a separate optical or other type (e.g. ultrasonic) of rangefinder 48 to identify the subject of the image and to select a focus position for taking lens unit 22 that is appropriate for the distance to the subject. Rangefinder 48 can operate lens driver 30 directly or as is shown in the embodiment of FIG. 1, rangefinder 48 can provide data to microprocessor 50. In the embodiment of FIG. 1, a feedback loop is established between lens driver 30 and microprocessor 50 so that microprocessor 50 can accurately set the focus position of taking lens unit 22, which, in turn, causes lens driver 30 to move one or more mobile elements 26 of taking lens unit 22 into focus.

Rangefinder 48 can be passive or active or a combination of the two. A wide variety of suitable multiple sensor rangefinders 48 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses one embodiment of such a rangefinder 48.

Image sensor 24 has a discrete number of photosensitive elements arranged in a two-dimensional array. Each individual photosite on image sensor 24 corresponds to one pixel of the captured digital image, referred to herein as an initial image. Image sensor 24 can be for example a conventional charge coupled device (CCD) sensor, a complementary metal oxide semiconductor image sensor and/or a charge injection device. In one example embodiment, image sensor 24 has an array of 1280×960 photosensitive elements. The photosensitive elements, or photosites, of image sensor 24 convert photons of light from the scene into electron charge packets. In one embodiment, each photosite is overlaid with a color filter array, such as the Bayer color filter array described in commonly assigned U.S. Pat. No. 3,971,065, entitled "Color Imaging Array" filed by Bayer on Mar. 7, 1975, the disclosure of which is herein incorporated by reference. The Bayer color filter array has 50% green photosites in a checkerboard mosaic, with the remaining photosites alternating between red and blue rows. The photosites respond to the appropriately colored incident light illumination to provide an analog signal corresponding to the intensity of illumination incident on the photosites. Various other color filters can be used. A color filter can be omitted where image sensor 24 is used to capture gray scale or so-called black and white images.

The analog output of each pixel is amplified by an analog amplifier (not shown) and is processed by an analog signal processor 34 to reduce the output amplifier noise of image sensor 24. The output of analog signal processor 34 is converted to a captured digital image signal by an analog-to-digital (A/D) converter 36, such as, for example, a 10-bit A/D converter which provides a 10 bit signal in the sequence of the Bayer color filter array.

The digitized image signal is temporarily stored in a frame memory 38, and is then processed using a programmable digital signal processor 40 as described in commonly assigned U.S. Pat. No. 5,016,107 filed by Sasson et al. on May 9, 1989, entitled "Electronic Still Camera Utilizing Image Compression and Digital Storage" the disclosure of which is herein incorporated by reference. The image processing includes an interpolation algorithm to reconstruct a full resolution color image from the color filter array pixel values using, for example, the methods described in commonly assigned U.S. Pat. No. 5,373,322 entitled "Apparatus and Method for Adaptively Interpolating a Full Color Image Utilizing Chrominance Gradients" filed by LaRoche et al. on Jun. 30, 1993, and U.S. Pat. No. 4,642,678 entitled "Signal Processing Method and Apparatus for Producing Interpolated Chrominance Values in a Sampled Color Image Signal" filed by Cok on Feb. 3, 1986, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

Digital signal processor 40 uses the initial images to create archival images of the scene. Archival images are typically high-resolution images suitable for storage, reproduction, and sharing. Archival images are optionally compressed using the JPEG (Joint Photographic Experts Group) ISO 10918-1 (ITU-T.81) standard and stored in a data memory 44. The JPEG compression standard uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data can be stored using the so-called "Exif" image format defined in the Exchangeable Image File Format version 2.2 published by the Japan Electronics and Information Technology Industries Association JEITA CP-3451. The Exif format archival image can also be stored in a memory card 52. In the embodiment of FIG. 1, imaging system 20 is shown having a memory card slot 54 which holds a removable memory card 52 and has a memory card interface 56 for communicating with memory card 52.

An Exif format archival image and any other digital data can also be transmitted to a host computer (not shown), which is connected to imaging system 20 through a host computer interface 46. Host computer interface 46 can be for example, an optical, radio frequency or other transducer that converts image and other data into a form that that can be exchanged with a host computer or network (not shown) by way of an optical signal, radio frequency signal or other form of signal.

Digital signal processor 40 also creates smaller size digital images based upon the initial images. These smaller sized images are referred to herein as evaluation images. Typically, the evaluation images are lower resolution images adapted for display using viewfinder display 33 (optional view finder option 35) or exterior display 42. Viewfinder display 33 and exterior display 42 can comprise, for example, a color or gray scale liquid crystal display (LCD), organic light emitting display (OLED) also known as an organic electroluminescent display (OELD) or other type of video display. An optional display driver 39 can be used to convert image signals from digital signal processor 40 into a form that can be presented using display 33. Alternatively, in some embodiments, digital signal processor 40 can directly generate signals that can cause a display such as exterior display 42 to present images.

In an image capture sequence, digital signal processor 40 can use the initial images to generate evaluation images, archival images or both. As used herein, the term "image capture sequence" comprises at least an image composition phase and an image capture phase and can optionally also include a verification phase.

During composition, microprocessor 50 sends signals to a timing generator 66 indicating that images are to be captured. Timing generator 66 is connected, generally, to the elements of imaging system 20, as shown in FIG. 1, for controlling the digital conversion, compression, and storage of the image signal. Image sensor 24 is driven by timing generator 66 via a sensor driver 68. Microprocessor 50, timing generator 66 and sensor driver 68 cooperate to cause image sensor 24 to collect charge in the form of light from a scene for an integration time that is either fixed or variable. After the integration time is complete, an image signal is provided to analog signal processor 34 and converted into initial images which can be used as evaluation images or archival images as is generally described above. A stream of initial images is captured in this way and digital signal processor 40 generates a stream of evaluation images based upon the initial images. The stream of evaluation images is presented on viewfinder display 33 or exterior display 42. User 4 observes the stream of evaluation images and uses the evaluation images to compose the image. The evaluation images can be created as described using, for example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, the disclosure of which is herein incorporated by reference. The evaluation images can also be stored in data memory 44.

Imaging system 20 typically enters the capture phase when user 4 depresses shutter trigger button 60. However, the capture phase can also be entered in other ways, for example, in response to a timer signal from microprocessor 50 or a remotely received signal. During the capture phase, microprocessor 50 sends a capture signal causing digital signal processor 40 to select an initial image and to process the initial image to form an archival image. During the verification phase, a corresponding evaluation image is also formed from the initial image used to form the archival image and the corresponding evaluation image is supplied to viewfinder display 33 or exterior display 42 and is presented for a period of time. This permits user 4 to verify that the appearance of the captured archival image is acceptable.

In one alternative embodiment, the initial images that are captured by image sensor 24 are captured in the form of an archival images which are then modified for use as evaluation images. In another alternative embodiment, imaging system 20 has more than one system for capturing images. For example, in FIG. 1 an optional additional image capture system 69 is shown. This additional image capture system 69 can be used for capturing archival images. The additional image capture system 69 can comprise an image capture system that records images using a high-resolution digital imager or a photographic element such as a film or plate. Where an additional image capture system 69 is used, the images captured by image sensor 24 can be used as the evaluation images.

Figure 2:
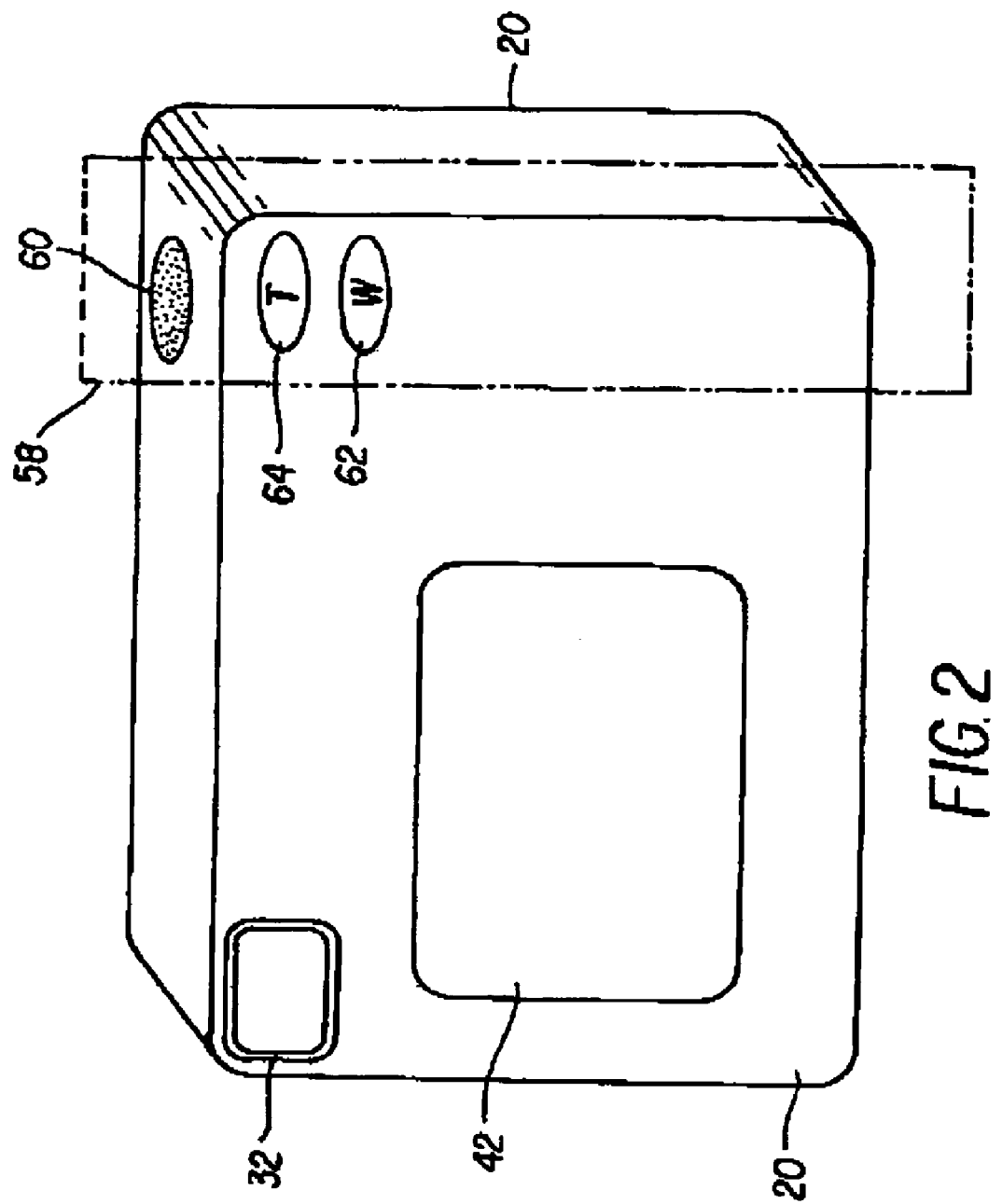
FIG. 2 is an illustration of a back view of the imaging system of FIG. 1.

Imaging system 20 is controlled by user controls 58, some of which are shown in more detail in FIG. 2. User controls 58 can comprise any form of transducer or other device capable of receiving input from user 4 and converting this input into a form that can be used by microprocessor 50 in operating imaging system 20. For example, user controls 58 can comprise touch screen, four way, six way, eight way rocker switches, joysticks, styluses, track balls, voice recognition systems, gesture recognition systems and other such systems. In the embodiment shown in FIG. 2, user controls 58 include shutter trigger button 60 which initiates a picture taking operation by sending a signal to microprocessor 50 indicating user 4's desire to capture an image. Microprocessor 50 responds to this signal by sending a capture signal to digital signal processor 40 as is generally described above.

A "wide" zoom lens button 62 and a "tele" zoom lens button 64, are provided which together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the digital signal processor 40, which crops and resamples the captured image stored in the frame memory 38. When user 4 first turns on imaging system 20, the zoom lens is set to the 1:1 position, so that all sensor photoelements are used to provide the captured image, and the taking lens unit 22 is set to the wide angle position. In a preferred embodiment, this wide-angle position is equivalent to a 40 mm lens on a 35 mm film camera. This corresponds to the maximum wide-angle position.

When the user then depresses the "tele" zoom lens button 64, taking lens unit 22 is adjusted by microprocessor 50 via the lens driver 30 to move taking lens unit 22 towards a more telephoto focal length. If user 4 continues to depress the "tele" zoom lens button 64, the taking lens unit 22 will move to the full optical 2:1 zoom position. In a preferred embodiment, this full telephoto position is equivalent to a 80 mm lens on a 35 mm film camera. If user 4 continues to depress the "tele" zoom lens button 64, the taking lens unit 22 will remain in the full optical 2:1 zoom position, and digital signal processor 40 will begin to provide digital zoom, by cropping (and optionally resampling) a central area of the image. While this increases the apparent magnification of the camera, it causes a decrease in sharpness, since some of the outer photoelements of the sensor are discarded when producing the archival image. However, this decrease in sharpness would normally not be visible on the relatively small viewfinder display 33 and exterior display 42.

For example, in imaging system 20 of FIG. 1, the captured image is derived from a high-resolution image sensor 24, having for example 1280×960 photosites, corresponding to about 1.25 megapixels. The term resolution is used herein to indicate the number of picture elements or pixels used to represent an image. Exterior display 42, however, has lower resolution providing, for example, 320×240 elements, which correspond to about 0.08 megapixels. Thus, there are 16 times more sensor elements than display elements. Accordingly, it is necessary to resample the initial image into an evaluation image having a suitably small image size so that it can properly fit on viewfinder display 33 or exterior display 42. This resampling can be done by using low pass filtering, followed by sub-sampling, or by using bilinear interpolation techniques with appropriate anti-aliasing conditioning. Other techniques known in the art for adapting a high-resolution image for display on a relatively low-resolution display can alternatively be used.

The resampling of the captured image to produce an evaluation image having fewer pixels (i.e. lower resolution) than the captured image is performed by digital signal processor 40. As noted earlier, digital signal processor 40 can also provide digital zooming. In the maximum 2:1 setting, digital signal processor 40 uses the central 640×480 sensor area to provide the archival image by interpolating this central area up to 1280×960 samples.

Digital signal processor 40 can also modify the evaluation images in other ways so that the evaluation images match the appearance of a corresponding archival image when viewed on viewfinder display 33 or exterior display 42. These modifications include color calibrating the evaluation images so that when the evaluation images are presented on viewfinder system 32 or exterior display 42, the displayed colors of the evaluation image appear to match the colors in the corresponding archival image. These and other modifications help to provide user 4 with an accurate representation of the color, format, scene content and lighting conditions that will be present in a corresponding archival image.

As noted above, because evaluation images are displayed using an electronic display that has lower resolution than a corresponding archival image, an evaluation image may appear to be sharper when viewed through viewfinder display 33 or exterior display 42 than it will appear when the archival image is printed or otherwise displayed at higher resolution. Thus, in one optional embodiment of the present invention, each evaluation image can be modified so that areas that will appear out of focus in a corresponding archival image could appear to be out of focus when viewed on an electronic display such as exterior display 42. Moreover, when the digital zoom is active, the entire image is softened, but this softening would normally not be visible in exterior display 42. For the example in imaging system 20 of FIG. 1, exterior display 42 can be a display having 320×240 display elements while the archival image is provided using a sensor area of 640×480 photosites in the maximum digital zoom setting. Thus, the evaluation image displayed on exterior display 42 after normal resizing will appear suitably sharp. However, the archival image will not produce an acceptably sharp print. Therefore, a resampling technique can be used which creates an evaluation image having 320×240 image elements corresponding to the 320×240 display elements of exterior display 42 but having reduced apparent sharpness when the maximum digital zoom setting is used.

It will be appreciated that the apparent sharpness of a print or other tangible output that is made from the archival image is also a function of the size of the rendered image. As described in commonly assigned U.S. patent application Ser. No. 10/028,644 entitled "Method and Imaging system for Blurring Portions of a Verification Image To Show Out of Focus Areas in a Captured Archival Image", filed by Belz, et al. on Dec. 21, 2001, imaging system 20 can optionally have an input (not shown) for receiving a signal indicating the expected size of the output and can adjust the apparent sharpness of the evaluation image accordingly and/or provide a warning.

Figure 3:
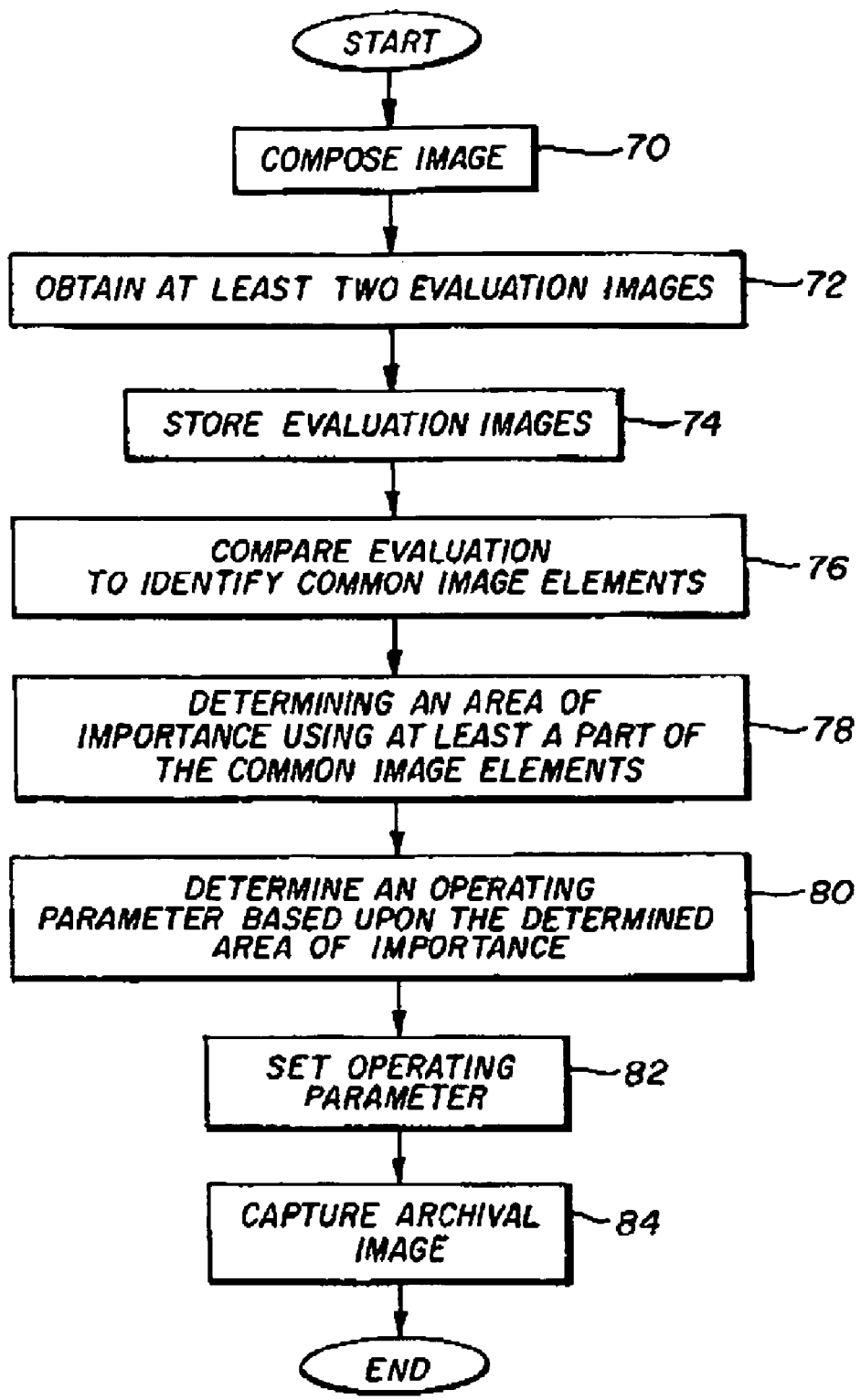
FIG. 3 is a flow diagram of one embodiment of a method of the present invention.
Figure 4A:
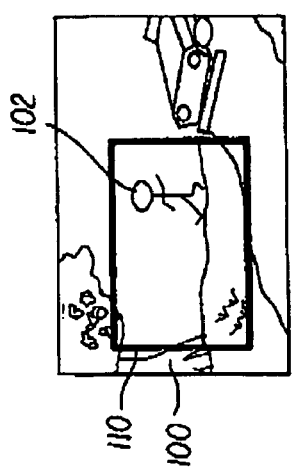
FIGS. 4A-4F illustrate scene image information captured by a sequence of evaluation images during composition of an image.
Figure 4B:
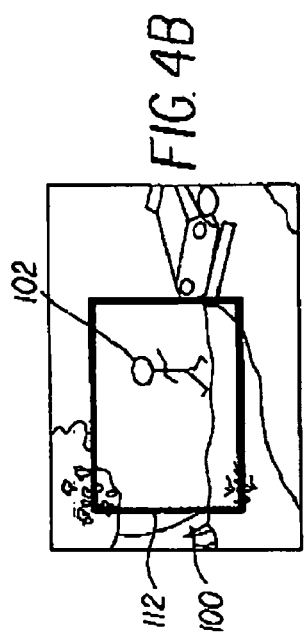
Figure 4C:
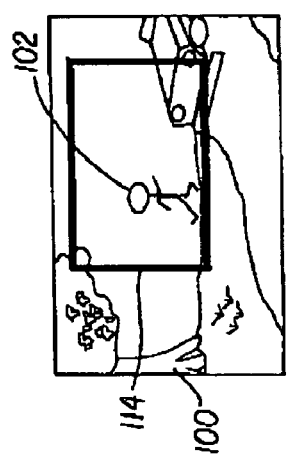
Figure 4D:
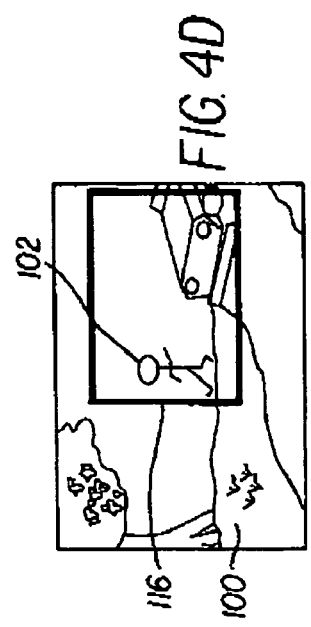
Figure 4E:
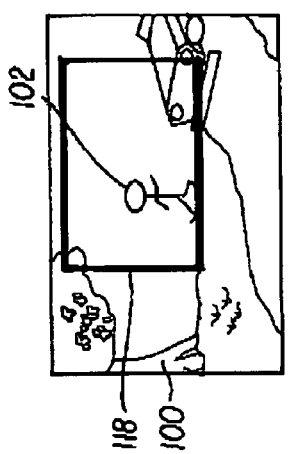
Figure 4F:
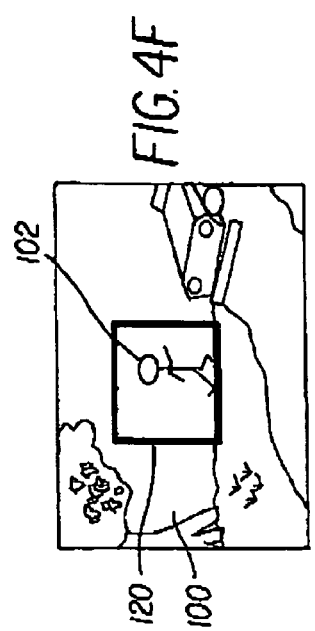

The use of imaging system 20 to determine an areas of importance in an archival image will now be described with reference to FIGS. 3, 4A-4F, 5 and 6. FIG. 3 shows a flow diagram of a first embodiment of a method in accordance with the present invention. As is shown in FIG. 3, imaging system 20 begins the process of determining an operating parameter when imaging system 20 enters an image composition mode (step 70). Imaging system 20 can be caused to enter the image composition mode in a variety of ways. For example, the image composition mode can be entered when microprocessor 50 detects that shutter trigger button 60 is moved to a half-depression or other non-fully depressed position. Alternatively, a detector (not shown) can generate a signal that microprocessor 50 can detect and use as a flag for entering the composition mode in response to the positioning of a mode selection switch (not shown). In another alternative, imaging system 20 can have sensors (not shown) detect that imaging system 20 is being held in a way that is associated with image composition. In still another alternative, imaging system 20 can enter the image composition mode whenever a detector (not shown) detects the presence of an eye 2 of user 4 that is positioned to observe images in viewfinder system 32 or on display 42.

Evaluation images that are captured during composition of a scene 100 containing a subject 102 as illustrated in FIGS. 4A-4E are obtained (step 72). The evaluation images can be obtained from the initial images that are captured and displayed on viewfinder display 33 or exterior display 42 as described above to aid user during composition. The evaluation images are stored, for example, in frame memory 38, data memory 44 or memory card 52. At least two evaluation images are stored during composition (step 74).

In one embodiment, a predefined number of evaluation images are stored during composition. In other embodiments, a memory such as frame memory 38 can provide a first in last out buffer containing a sequence of a predetermined number of evaluation images captured during composition. In this embodiment, as the image composition process begins, the buffer is filled with stored evaluation images. If the composition process continues after the buffer is filled, newly captured evaluation images replace the oldest captured evaluation images. Thus, where this is done, the buffer contains only the most recently captured evaluation images. This process continues until the time that the operating parameter is determined. In still another embodiment, all evaluation images captured between the time that composition begins and the operating parameter is determined are stored. In still another embodiment, only those evaluation images that are captured during a predetermined period of time prior to capture of the archival image are stored. Other useful evaluation image storage strategies can also be used.

In the illustrations of FIGS. 4A-4F and 5, evaluation images 110, 112, 114, 116, 118 and 120 are illustrated as being obtained (step 72) and stored (step 74) during composition as is generally described above.

The operating parameter can be determined at any of a number of times. Typically, the operating parameter is determined at or about the time that microprocessor 50 generates the capture signal as is generally described above. However, it will be appreciated that operating parameters can be determined at other times. For example, it may be necessary to determine one or more operating parameters during the process of capturing and presenting evaluation images. This allows evaluation images to be captured and presented in a better form and allows a user to make any desired adjustments to scene composition and to make manual adjustments to capture settings. User 4 may "instruct" imaging system 20 to determine operating parameters on the desired area of importance by moving the field of view accordingly, and this can be reflected in the presented evaluation images.

Whenever the operating parameter is determined, digital signal processor 40 compares the stored evaluation images to identify areas of the scene that correspond to image elements that are common to the captured evaluation images (step 76). All of the stored evaluation images can be compared or, alternatively, various sampling methods can be used to select some of the stored evaluation images for use in determining the common image areas. For example, only those evaluation images that were captured during the last few seconds before the time of determining the operating parameter can be used. Alternatively, every second or every fourth stored evaluation image can be compared, or some other like criterion can be used. Acquisition of evaluation images and determination of the operating parameter may cease when significant change in evaluation images ceases. Thus when user 4 stops changing the field of view of imaging system 20, acquisition of evaluation images will stop and the operating parameter can be determined. Other meaningful statistical sampling patterns can be used such as those that use a weighted ratio of samples selected from the group of evaluation images.

In another example, the evaluation images can be compared to detect shifts in the field of view of the evaluation images that are smaller than a maximum threshold and closest in time to the time of determining the operating parameter with only the evaluation images meeting these conditions used for comparison. This approach has the advantage of reducing the number of false readings that might occur because of large shifts in the field of view of imaging system 20 that often happen during the initial phases of archival image composition, and/or that may occur as a result of adjusting a zoom lens setting.

The evaluation images can be compared on an image element by image element basis. Conventional image comparison algorithms can be used for this purpose. The relative motion of the camera between compared images can be determined and used for determining the common image areas. For example, the image comparison algorithms used in creating Motion Picture Export Group-2 compressed video streams can be applied to the evaluation images and the product of such algorithms can be used to determine common image elements. The comparison of the evaluation images can also determine areas in the evaluation images that contain substantially similar but not identical image elements. This may be necessary due to subject motion during the composition phase. Alternatively, key elements or patterns of elements representing objects in the evaluation images can be identified and the common elements can be determined by searching for these key elements or patterns of elements in evaluation images.

Figure 5:
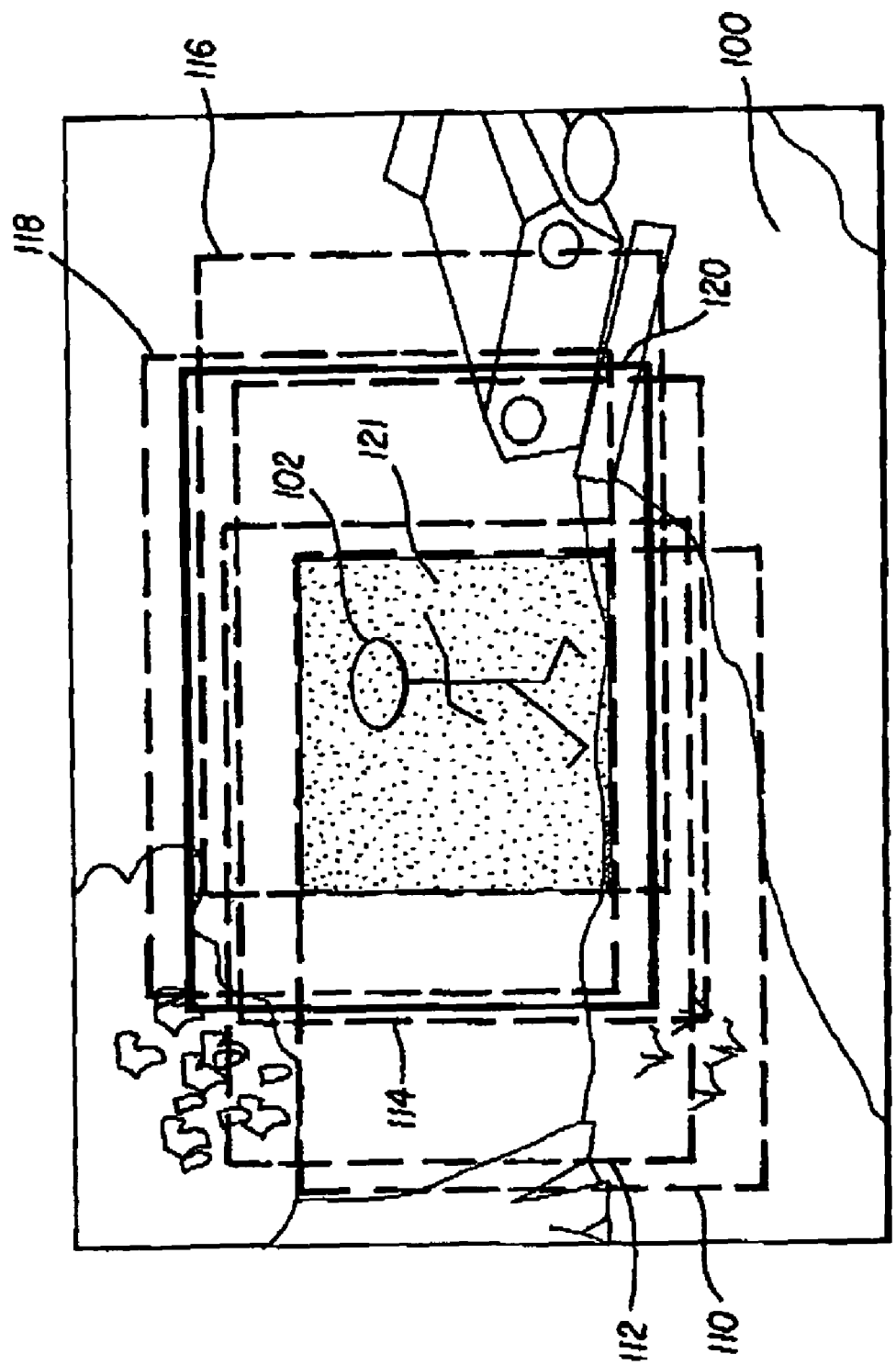
FIG. 5 illustrates the scene with the captured evaluation images and the area of importance.
Figure 6:
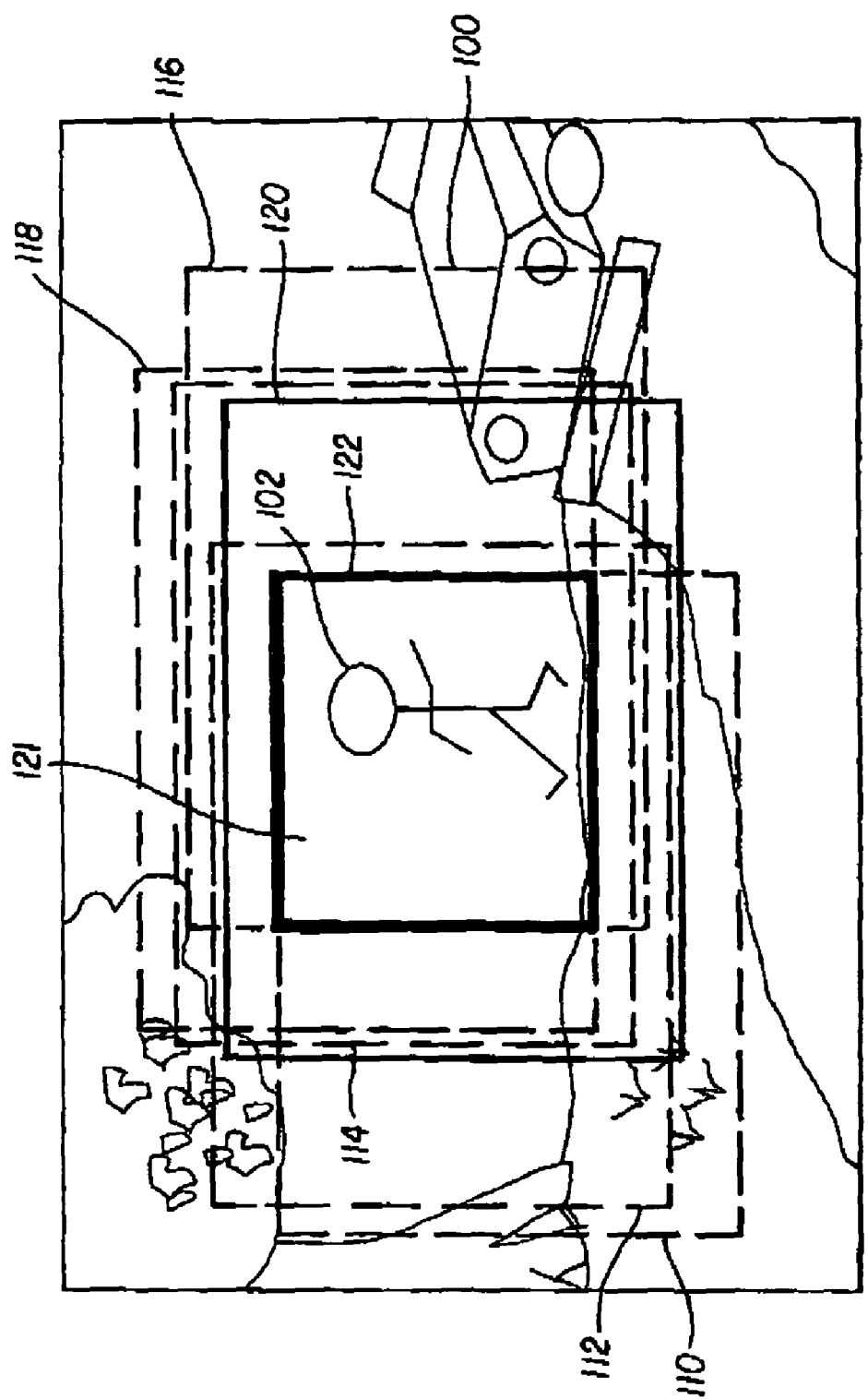
FIG. 6 illustrates scene with the area of importance displayed therein, and the evaluation images shown in phantom.

FIGS. 5 and 6 illustrate the results of such a comparison. In this embodiment the set of evaluation images 110, 112, 114, 116, 118 and 120 is compared. The image elements that are common to each of the evaluation images are contained in an area 121. The area of importance is then determined based upon at least some of the common image elements in area 121 (step 78). The area of importance in scene 100 can comprise, for example, that portion of scene 100 that corresponds to the common image elements. Alternatively, the area importance can comprise a portion of scene 100 comprising a predefined shape or template that is located based upon at least a part of the common image elements. In still another embodiment, the area of importance is determined by identifying particular subject matter within the common image elements, selecting an area of interest shape or template based upon the identified subject matter, and, optionally locating the area of interest shape with respect to the scene based upon the location of the common image elements. Other methods for defining an area of importance based upon the common image elements can be used. The area of importance may be indicated to user 4 by presenting the evaluation image on display 42 with an indication box (not shown) or change in contrast.

Although shown as a rectangular space in the illustrations of FIGS. 5 and 6, it will be appreciated that the common image elements can comprise any shape or form and that the an area of importance 122 can have any of a number of other shapes and forms.

An operating parameter is then determined based upon analysis of the area of importance (step 80). The operating parameter can be any parameter that is used by image capture device 10 for capturing an image such as the initial image, an evaluation image, or an archival image. The operating parameter can include parameters such as exposure settings including use of flash, settings for taking lens unit 22 such as focus distance, contrast settings, and color balance and white balance settings. The operating parameter can also take the form of a modification to image data on the basis of the analysis of the area of importance. For example, if scene 100 is illuminated by a tungsten based lighting the area of importance while the remainder of the scene is in some other lighting such as light from a fluorescent based illuminant, image data modifications appropriate to the tungsten lighting can be applied to the image.

Alternatively, in accordance with the present invention different areas of the scene can be isolated and analyzed. Where appropriate, different modifications may be applied to the area of importance and the area outside of the area of importance. These different image modifications can comprise for example, applying a tungsten illuminant image correction to areas of the above described image that are illuminated by the tungsten based illuminant and applying a fluorescent image correction to areas of the above described image that are illuminated by the fluorescent illuminant.

It will also be appreciated that other operating parameters can be determined separately for the area of importance and for areas outside of the area of importance. For example, in the through focusing techniques described above, it may be useful to set one focus distance for capturing an image of the area of importance and another focus distance for capturing an image of other areas. More than one archival image may be captured for combination after capture so that the preferred focus distance for each area is preserved. Alternatively, a focus distance can be established for capturing the area of importance in the image in focus and where desired for artistic or other reasons, image data for other areas of the image outside of the area of importance can be adjusted to intentionally reduce the sharpness of these areas. Similarly, differing sharpening or blurring algorithms can be applied to the different areas.

Figure 7:
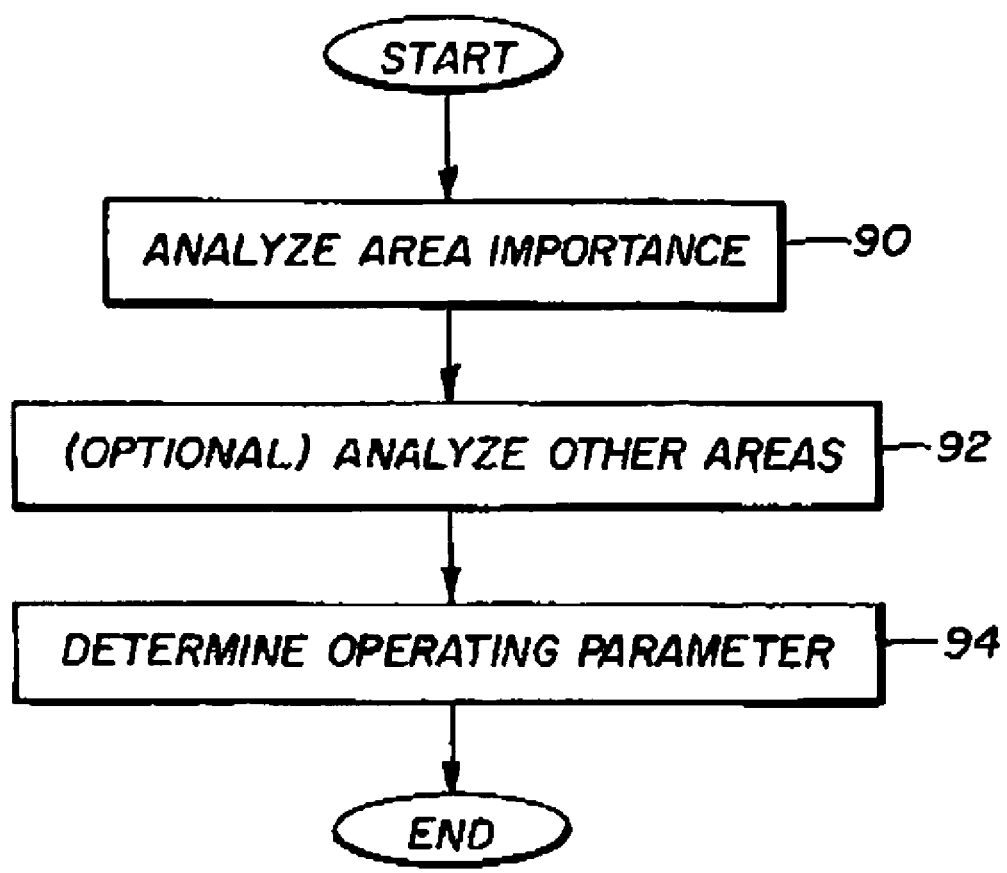
FIG. 7 shows a flow diagram of one embodiment of a method for determining an operating parameter.

FIG. 7 shows a flow diagram of one embodiment of a method for determining an operating parameter using the area of importance. In this method, the area of importance is analyzed using scene analysis techniques (step 90) and the operating parameter is then determined based upon the analysis of the area of importance in the scene (step 94). There are a variety of ways in which this can be done. For example, using a conventional multi spot automatic rangefinder, the distance from imaging device 10 to each of a number of areas in a photographic scene can be determined. In this example, the determined area of importance in the scene is associated with one of the areas and the distance from the imaging device 10 to that area, as determined by rangefinder 48 can be used to determine a focus distance for taking lens unit 22. Similarly, the determined area of importance can be used in combination with whole-way-scanning or through focusing techniques to determine a focus distance.

In another example, signal processor 40 or microprocessor 50, can determine luminance conditions in the area of importance by analyzing portions of evaluation images that are contained within the area importance. After the luminance conditions are determined, signal processor 40 or microprocessor 50 can generate a signal that activates a flash illumination system (not shown), that adjusts the integration time that is used to by image sensor 24 to capture an image, or that otherwise adjusts a shutter time for an electromechanical shutter system (not shown) such as the type that may be used with certain types of image sensors 24 and/or as a component of additional image capture system 69.

Other known processes for determining an operating parameter can be used in like fashion. It will be appreciated that, by using the area of importance in conjunction with such processes, the amount of time required to perform such processes can be greatly reduced as, in certain embodiments, such processes need only be executed for a portion of the scene corresponding to the area importance.

Optionally, other information such as information obtained from analysis of scene areas other than the area of importance can also be used to determine the operating parameter (step 94). This other information is used however to supplement the analysis performed in step 92. For example, information from areas outside of the area of importance can be analyzed where analysis of the area of importance yields results that suggest that additional information can be useful.

Returning now to FIG. 3, after operating parameter is determined, the operating parameter is set (step 82) so that operating parameter can be used by imaging device 20. For example, where the parameter is a focus distance, microprocessor 50 can cause lens driver 30 to adjust the settings of taking lens unit 22. In another example, microprocessor 50 can determine exposure conditions in the area of importance and can cause an operating parameter such as an integration time used in operating sensor 22 or a flash intensity setting for an artificial illumination or flash system (not shown) to be adjusted. This procedure is particularly useful in instances where the illumination of the area of importance differ significantly from the average of the whole of the archival image such as in the case of a backlit subject. In still other embodiments, other components such as digital signal processor 40 can be used to set the operating parameter. Once set, the operating parameter can be used by imaging device 20 to capture an image.

It will be appreciated that the operating parameter can be applied to one or both of the image capture processes used to capture images using image sensor 24 and/or an additional image capture system 69 such as a photochemical image capture system that records images on a photosensitive element, such as a film.

Figure 8:
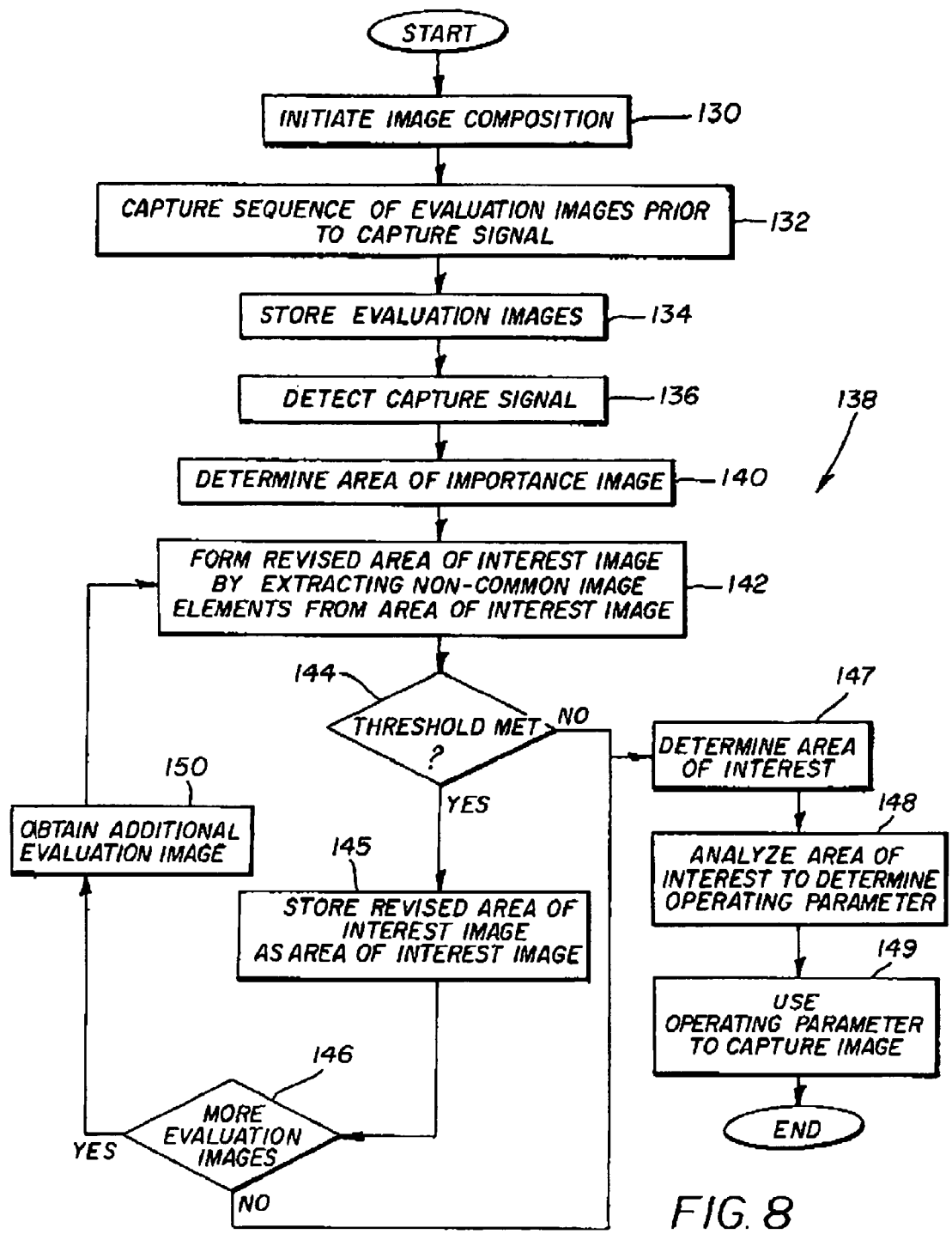
FIG. 8 is a flow diagram of another embodiment of a method of the present invention.

FIG. 8 shows a flow diagram of another embodiment of the method of the present invention. In this embodiment, the method begins when image composition is initiated (step 130). As illustrated in FIGS. 9A-9F during the image composition evaluation images 151, 152, 154, 156, 158 and 160 are captured (step 132) and stored (step 134) in sequence over a period of time before a capture signal requesting capture of an archival image (step 136) is detected. When the capture signal is detected, the stored evaluation images are compared (step 138). In the embodiment shown, the comparison is performed by using the optional expedient of forming an area of interest image based upon the evaluation images. In a first step of this embodiment, the evaluation image 160 captured last in time before a time t at which a capture signal is received defined initially as an area of importance image (step 140).

The obtained area of importance image 160 is compared to each individual evaluation image in the sequence of evaluation images beginning with evaluation image 158 that is captured immediately prior to evaluation image 160 and continuing with additional prior images in reverse sequence, e.g. image 156, image 154, image 152, etc. With each comparison, a revised area of importance image is formed by extracting image elements from the area of importance image that are not found in both the area of interest image and the evaluation image to which the area of interest image is being compared (step 142). The revised area of importance image is compared to a threshold condition (step 144). When the threshold condition is not met, the revised area of interest image is stored (step 145) as an area of interest image.

When the threshold condition is not met, a determination is then made as to whether more evaluation images are available for comparison (step 146). Where more evaluation images are available, the revised area of importance image is stored as an area of importance image (step 145), if more evaluation images are available (step 146) an additional evaluation image is obtained (step 150) and the comparison process continues until the common image elements in a revised area of interest image fail to meet the threshold condition (step 144) or until the archival image has been compared to each of the sequence of evaluation images (step 146).

The threshold condition can be one of many conditions each intended to ensure that the area of importance that is determined by the comparison step provides a meaningful area of importance indication. An example of a predetermined condition is the size of the area of importance image. The threshold condition can take other forms, for example the threshold condition can define a minimum horizontal space for the area of importance, a minimum vertical space for the area of importance or both. The threshold condition can also take the form of a predefined portion of the overall image space of the area of importance image, a predefined shape or a predefined distribution pattern. Additionally, the threshold condition can be quantified in terms of time before acquisition of the archival image or the number of evaluation images captured immediately before capture of the archival image.

A detailed example of this process is illustrated in FIGS. 9A-9F. As shown in FIG. 9F an area of importance image 160 is obtained corresponding to an evaluation image 160 captured at time t, such as the moment that a capture signal is detected, (step 140) as is shown in FIG. 9B. A revised area of importance image 162 is formed by comparing evaluation image 160 to evaluation image 158, which was captured immediately before the capture of evaluation image 160, at time t−1 (step 142). As a result of this comparison, image elements that are not common to both area of importance image 160 and evaluation image 158 are identified. The non-common elements are extracted from area of importance image 160 to yield a revised area of importance image 162 (step 142). A determination is made as to whether revised area of importance image 164 meets a threshold condition that is shown as minimum size threshold 170 (step 144). When revised area of importance image 162 meets the minimum size threshold 170 the revised area of importance image 162 is stored as the area of importance image (step 145). If more evaluation images are available, (step 146) an additional evaluation image is obtained (step 150) and the process returns to the step of comparing the preliminary area of importance image to the next evaluation image, evaluation image 156, captured at time t−2 (step 142) and shown in FIG. 9D.

The area of importance image, now image 162, is then compared to evaluation image 156 to identify image elements that are not common to both evaluation image 156 and area of importance image 162. The non-common elements are extracted from area of importance image 162 to yield a further revised area of importance image 164 as is shown in FIG. 9D (step 142 of). A determination is then made as to whether revised area of importance image 164 meets the minimum size threshold 170 (step 144). The revised area of importance image 164 is stored as the area of importance image (step 145).

If more evaluation images area available (step 146) an additional evaluation image is obtained (step 150) and the process returns to the step of comparing the area of importance image, now image 164 to the next evaluation image, evaluation image 154, captured at time t−3 (step 142) and shown in FIG. 9C. As a result of this comparison, image elements that are not common to evaluation image 154 and area of importance image 164 are identified (step 142). Then non-common image elements are extracted from revised area of importance image 164 to yield a further revised area of importance image 166 as is shown in FIG. 9C (step 143). A determination is then made as to whether revised area of importance image 166 meets the minimum size threshold 170 (step 144). The revised area of importance image 166 is stored as the area of importance image (step 145). If more evaluation images area available (step 146) an additional evaluation image is obtained (step 150) and the process returns to the step of comparing the revised preliminary area of importance image 164 to the next evaluation image, evaluation image 152, captured at time t−4 (step 142).

The area of importance image, now image 166, is then compared to evaluation image 152 captured at time t−4 (step 142) and non-common image elements are extracted from revised area of importance image 166 which yields a further revised area of importance image 168 as is shown in FIG. 9B. A determination is then made as to whether revised area of importance image 168 meets the minimum size threshold 170. Here it is determined that the minimum size threshold 170 is not met.

Accordingly, the area of importance image and therefore the operating parameter are determined without consideration of evaluation images 151 shown in FIG. 9A and evaluation image 152.

Returning now to FIG. 8, when one of the threshold conditions is not met (step 144) or when the archival image has been compared to all of the evaluation images (step 146), an area of importance is determined based upon the area of importance image (step 147) and an operating parameter can be determined by analyzing a portion of the scene that corresponds to the area of importance (step 148). The determined operating parameter can then be used to capture an archival image (step 149).

In one embodiment of the invention, user 4 of imaging system 20 can have input as to which evaluation images are used to define the area of importance. For example, shutter trigger button 60 can be used to designate when evaluation images are to be captured and used to determine area of importance. In this example, evaluation images are captured when shutter trigger button 60 is moved to a partially depressed position. If shutter trigger button 60 is released without being fully depressed, then no archival image is captured, and the evaluation images are discarded. If shutter trigger button 60 is fully depressed, then an archival image is captured, and evaluation images captured between the time that shutter trigger button 60 is moved from the partial depression to the full depression position are stored and used for determining the area of importance and an operating parameter as described above.

In this manner user 4 can determine the set of images that are to be used in determining the area of importance. This process is illustrated in FIGS. 10A-10F which each show a photographic scene 200 with a person 202 therein. In this illustration, user 4 begins composition of an archival image of scene 200 by moving shutter trigger button 60 to the half-depression position. Composition begins with user 4 aiming imaging system 20 to capture images of a field of view that truncates person 202 as is shown in FIG. 10A. An evaluation image 210 of the field of view is presented and user 4 then attempts to correct this by moving the imaging system to capture an evaluation image 212 shown in FIG. 10B that reveals that this adjustment also truncates person 202. At this point user 4 can release the shutter trigger button 60 causing the evaluation images 210 and 212 to be discarded. User 4 then returns shutter trigger button 60 to the half-depression position and captures evaluation images 214 and 216 depicted in FIGS. 10C and 10D. Finally user 4 moves shutter trigger button 60 to the full depression position to capture archival image 218 depicted in FIG. 10E. Common image elements in images 214, 216 and 218 are identified as shown in FIG. 10F and used to determine an area of importance 220 which, in turn, is used to determine an operating parameter.

In an alternative embodiment of this type, shutter trigger button 60 is movable between a first depression position, a second depression position and a fall depression position. When shutter trigger button 60 is moved to the first depression position, the camera system begins capturing and presenting evaluation images, however, these evaluation images are not stored for use in determining an area of importance. When shutter trigger button 60 is moved to the second depression position, microprocessor 50 causes captured evaluation images to be stored for use in determining the area of importance. Microprocessor 50 continues storing the evaluation images until shutter trigger button 60 is returned to the first depression position or moved to the full depression position. Where shutter trigger button 60 is returned to the first depression position, the stored evaluation images are deleted. Where shutter trigger button 60 is moved to the full depression position, the stored evaluation images are used to determine an area of importance in the archival image. It will be appreciated that other user controls 58 can be supplied that can be used to allow user 4 to determine which evaluation images are to be stored evaluation images for use in determining an area of importance image or other form of area of importance data.

In the above-described embodiments, imaging system 20 has been described as comprising a still image capture system. However, in other embodiments, imaging system 20 can comprise a video camera or any other device having an image capture device adapted to obtain evaluation images and/or archival images.

The invention has been described in detail with particular reference to certain preferred embodiments thereof, but it will be understood that variations and modifications can be effected within the spirit and scope of the invention.

PARTS LIST 2 eye
4 user
20 imaging system
22 taking lens unit
24 image sensor
26 elements
28 elements
30 lens driver
32 viewfinder system
33 viewfinder display
34 analog signal processor
35 viewfinder optics
36 A/D converter
38 frame memory
39 display driver
40 digital signal processor
42 exterior display
44 data memory
46 host computer interface
48 rangefinder
50 microprocessor
52 memory card
54 memory card slot
56 memory card interface
58 user controls
60 shutter trigger button
61 accept button
62 "wide" zoom lens button
63 accept button
64 "tele" zoom lens button
66 timing generator
67 reject button
68 sensor driver
69 additional image capture system
70 compose image step
72 obtain at least one evaluation image step
74 temporarily store evaluation image step
76 compare step
78 determine area of importance step
80 determine operating parameter step
82 set operating parameter
84 image capture step
90 analyze area of importance step
92 option analyze other areas step
94 determine operating parameter
100 scene
102 subject
110 evaluation image
112 evaluation image
114 evaluation image
116 evaluation image
118 evaluation image
120 evaluation image
121 common image elements
122 area of importance
130 initiate composition step
132 capture evaluation image step
134 store evaluation image step
136 detect capture signal
138 compare evaluation images step
140 obtain area of importance step
142 compare step
145 threshold step
145 store revised area of importance step
146 determine remaining images step
147 determine area of interest step
148 analyze operating parameter step
149 use operating parameter step
150 obtain additional evaluation step
151 evaluation image
152 evaluation image
154 evaluation image
156 evaluation image
158 evaluation image
160 evaluation image
162 area of importance image
164 revised area of importance image
166 revised area of importance image
168 revised area of importance image
170 minimum size threshold
200 scene
202 person
210 evaluation image
212 evaluation image
214 evaluation image
216 evaluation image
218 archival image
220 area of importance

What is claimed is:

1. A method for determining an operating parameter for an imaging system, the method comprising the steps of:

obtaining a sequence of evaluation images during composition of an image;

storing the evaluation images;

comparing the evaluation images to determine common image elements by comparing the most recently obtained evaluation image to other evaluation images in the sequence of evaluation images beginning with the evaluation image obtained immediately prior to the most recently obtained evaluation image and continuing with additional prior obtained evaluation images until the identified common image elements define a predetermined minimum of vertical image elements of an archival image;
determining an area of importance based at least in part upon some of the common image elements; and
determining an operating parameter based upon analysis of the area of importance.

2. The method of claim 1, comprising the additional step of indicating the area of importance on a display.

3. The method of claim 1, wherein the determination of the area of importance commences when the evaluation images are detected to be not significantly different.

4. The method of claim 1, further comprising the step determining more than one operating parameter.

5. The method of claim 1, wherein each determined operating parameter is applied to capture an image.

6. The method of claim 4, further comprising the step of determining an operating parameter for areas outside of the area of importance based upon analysis of areas that are outside of the area of importance.

7. The method of claim 6, wherein the operating parameter for areas outside of the area of importance is applied to a step of processing a portion of an image that is outside of an area of importance.

8. The method of claim 6, wherein the operating parameter for areas outside of the area of importance is applied to a step of capturing an image of a scene that is outside of the area of importance.

9. The method of claim 1, wherein the operating parameter is determined based upon analysis of scene content in the area of importance.

10. The method of claim 1, wherein the evaluation images are captured within a predetermined time period immediately preceding capture of an archival image.

11. A method for determining an operating parameter for an imaging system, the method comprising the steps of:
obtaining evaluation images during composition of an image;
storing the evaluation images;
comparing the evaluation images to determine common image elements;
determining an area of importance based at least in part upon some of the common image elements; and
determining an operating parameter based upon analysis of the area of importance, wherein the operating parameter is a focus distance, wherein a sequence of evaluation images are captured and wherein the step of determining the common image elements are determined by comparing the sequence of evaluation images beginning with the evaluation image that is captured most recently and continuing with prior captured evaluation images in sequence until the identified common image elements define a predetermined minimum image space of the image elements at the evaluation images.

12. A method for operating an image capture device, the method comprising the steps of:
detecting a user input indicating a desire to capture an archival image of a scene;
obtaining a sequence of evaluation images during composition of the archival image;
comparing the evaluation images to determine common image elements by at least comparing the most recently captured evaluation image to other evaluation images in the sequence of evaluation images beginning with the image captured immediately prior to the most recently captured evaluation image and continuing with additional prior captured evaluation images;
determining an area of importance based upon at least some of the common image elements;
determining an operating parameter based upon analysis of the area of importance supplemented by analysis of areas outside of the area of importance; and
adjusting operation of the image capture device based upon the determined operating parameter so that the archival image will be captured using the operating parameter.

13. The method of claim 12, wherein the operating parameter is a focus distance.

14. The method of claim 12, further comprising the step of detecting a user input indicating that selected ones of the obtained evaluation images are to be used in determining the area of importance wherein only the selected evaluation images are used to determine the area of importance.

15. A method for operating an image capture device, method comprising the steps of:
capturing a set of evaluation images during composition of an archival image;
forming a preliminary area of importance image based upon the most recently captured evaluation image;
extracting portions of the preliminary area of importance image that do not correspond to image information in the other images of the set of evaluation images to obtain a revised preliminary area of importance;
determining an area of importance based upon the revised preliminary area of importance image;
determining an operating parameter based upon analysis of the area of importance; and
using the operating parameter to capture the archival image, wherein said operating parameter comprises a focus distance.

16. An imaging system comprising:
an image source operable to obtain a sequence of images of a scene; and
a signal processor adapted to cause the image source to obtain images and to compare the images to identify common image elements in the images by comparing the most recently obtained image to other images in the sequence of images beginning with the image obtained immediately prior to the most recently obtained image and continuing with additional prior obtained images until the identified common image elements define at least one of a predetermined minimum of vertical image elements of an archival image and a predetermined minimum image space of the image elements of the obtained images;
wherein the signal processor determines an area of importance in the scene based at least in part upon the identified common image elements and determines an operating parameter based upon analysis of the area of importance.

17. An imaging system comprising:
a composition trigger adapted to generate a composition signal and a capture trigger adapted to generate a trigger signal;
an image capture system adapted to capture a sequence of evaluation images of a scene when the composition signal is generated and to capture an archival image of the scene when an archival image capture signal is generated; and
a processor adapted to determine common image elements in the evaluation images and to determine an area of importance in the scene based upon the common image elements with the processor further being adapted to cause the area of importance in the scene to be analyzed, to determine an operating parameter based upon the analysis of the area of importance, with the processor being further adapted to determine the common image elements by comparing the most recently captured evaluation image to other evaluation images in the sequence of evaluation images beginning with the evaluation image captured immediately prior to the most recently captured evaluation image and continuing with additional prior captured evaluation images until the identified common image elements define at least one of a predetermined minimum of vertical image elements of an archival image and a predetermined minimum image space of the image elements of the evaluation images; and wherein the processor generates a capture signal in response to the trigger signal and causes the operating parameter to be used in the process of capturing the archival image and, wherein said operating parameter comprises a focus distance.

18. The imaging system of claim 17, wherein the processor causes the area of importance in the scene to be analyzed by analyzing the area of importance shown in at least one of the evaluation images.

19. The imaging system of claim 17, further comprising a rangefinder wherein the processor causes the area of importance to be analyzed by directing the rangefinder to determine a distance from the imaging system to the portion of the scene that corresponds to the determined area importance.

20. The imaging system of claim 17, wherein the processor is also adapted to cause areas outside of the area of importance to be analyzed and to determine the operating parameter based upon analysis of the area of importance as supplemented by analysis of areas outside of the area importance.

21. A imaging system comprising:
an image capture means for capturing an archival image and for capturing a sequence of evaluation image, during composition of the archival image;
a comparison means for comparing the evaluation images to identify common image elements by comparing the most recently captured evaluation image to other evaluation images in the sequence of evaluation images beginning with the evaluation image captured immediately prior to the most recently captured evaluation image and continuing with additional prior captured evaluation images until the identified common image elements define at least one of a predetermined minimum of vertical image elements of an archival image and a predetermined minimum image space of the image elements of the evaluation images;
a determining means for determining an area of importance in the scene based upon the identified common image elements; and
a determining means for determining an operating parameter based upon analysis of the area of importance, wherein said operating parameter is a focus distance.

22. A method for determining an operating parameter for an imaging system, the method comprising the steps of:
obtaining a sequence of evaluation images during composition of an image;
storing the evaluation images;
comparing the evaluation images to determine common image elements by comparing the most recently obtained evaluation image to other evaluation images in the sequence of evaluation images beginning with the evaluation image obtained immediately prior to the most recently obtained evaluation image and continuing with additional prior obtained evaluation images until the identified common image elements define at least one of a predetermined minimum of vertical image elements of an archival image and a predetermined minimum image space of the image elements of the evaluation images;
determining an area of importance based at least in part upon some of the common image elements;
determining a first operating parameter based upon analysis of the area of importance;
determining a second operating parameter based at least in part upon some of the image elements outside of the area of importance;
capturing an image according to the first operating parameter; and
capturing an image according to the second operating parameter, wherein said operating parameter is a focus distance.

23. The method of claim 1, wherein the operating parameter is a focus distance.

24. The method of claim 1, wherein the operating parameter is an exposure setting.

25. The method of claim 1, wherein the operating parameter is use of a flash.

26. The method of claim 1, wherein the operating parameter is a contrast setting.

27. The method of claim 1, wherein the operating parameter is a color balance setting.

28. The method of claim 1, wherein the operating parameter is a white balance setting.

29. The method of claim 1, wherein the operating parameter is an image data modification.

30. The method of claim 1, wherein an image data modification is applied to the area of importance and a different image data modification is applied to other portions of the image.

31. The method of claim 1, wherein the operating parameter is an image data modification of sharpening.

32. The method of claim 1, wherein the operating parameter is determined based upon analysis of scene illumination in the area of importance.

33. The method of claim 16, wherein the operating parameter is an exposure setting.

34. The method of claim 16, wherein the operating parameter is a contrast setting.

35. The method of claim 16, wherein the operating parameter is a focus distance.

36. The method of claim 16, wherein the operating parameter is color balance.

37. The method of claim 16, wherein an image data modification is applied to the area of importance and a different image data modification is applied to other portions of the image.

38. The method of claim 16, wherein the operating parameter is an image data modification of sharpening.

39. The method of claim 16, wherein the operating parameter is determined based upon analysis of scene content in the area of importance.

40. The method of claim 16, wherein the operating parameter is determined based upon analysis of scene illumination in the area of importance.

* * * * *